Oct. 14, 1952          D. F. SWANSON          2,613,588
AUTOMATIC COFFEE MAKING AND DISPENSING APPARATUS
Filed Aug. 19, 1948          5 Sheets—Sheet 1
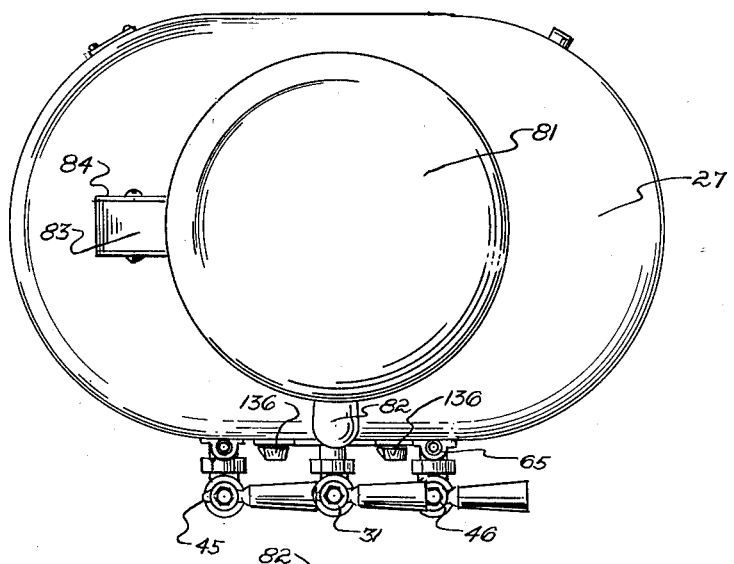
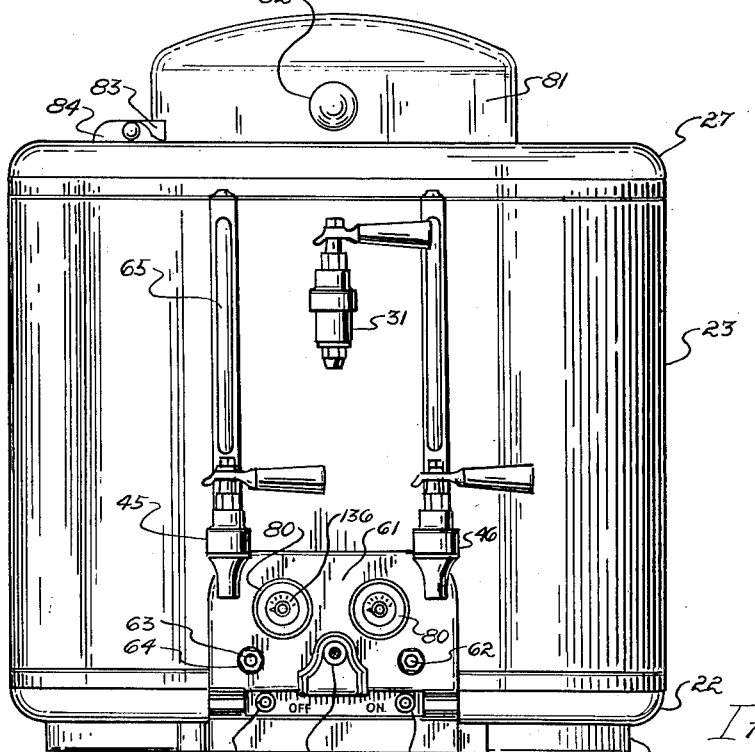

Oct. 14, 1952        D. F. SWANSON        2,613,588
AUTOMATIC COFFEE MAKING AND DISPENSING APPARATUS
Filed Aug. 19, 1948        5 Sheets-Sheet 2
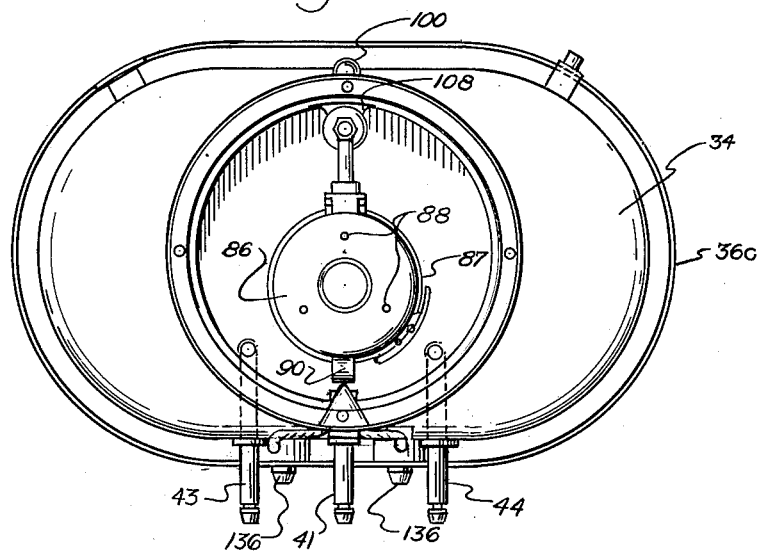
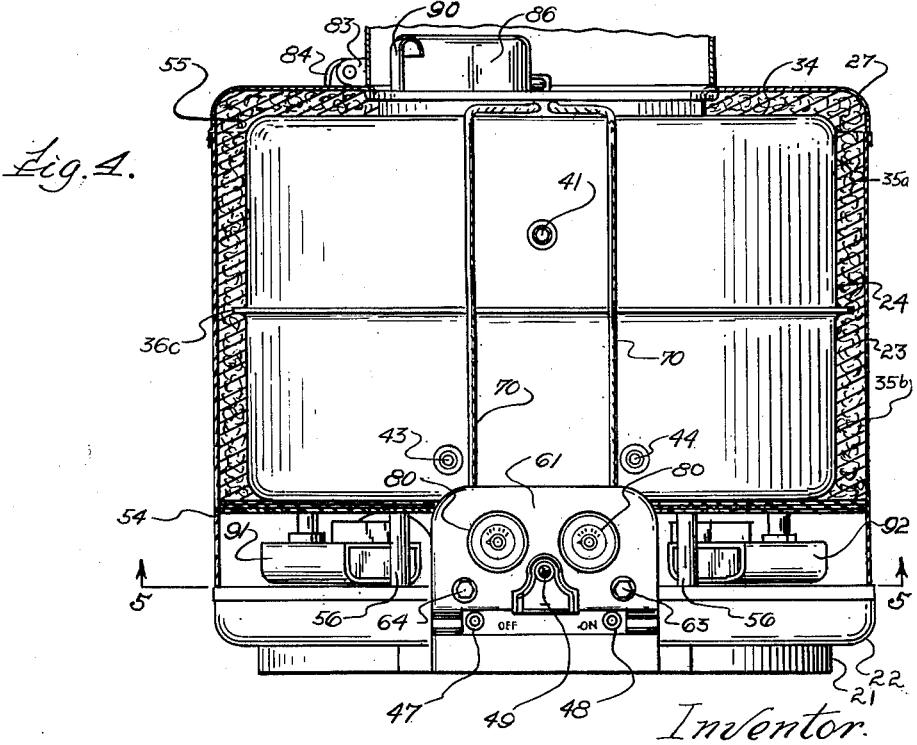
Inventor.
Donald F. Swanson.
by John F. Brezina
Attorney.

Oct. 14, 1952 D. F. SWANSON 2,613,588
AUTOMATIC COFFEE MAKING AND DISPENSING APPARATUS
Filed Aug. 19, 1948 5 Sheets-Sheet 3

Inventor
Donald F. Swanson
by John F. Brezina
Attorney

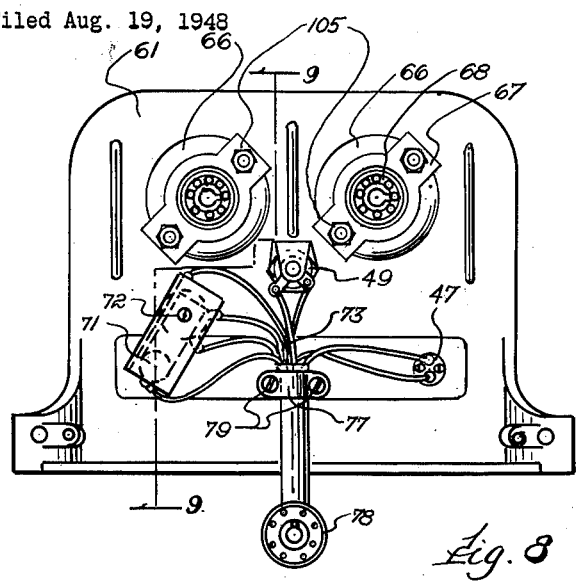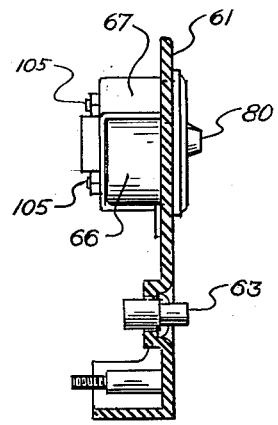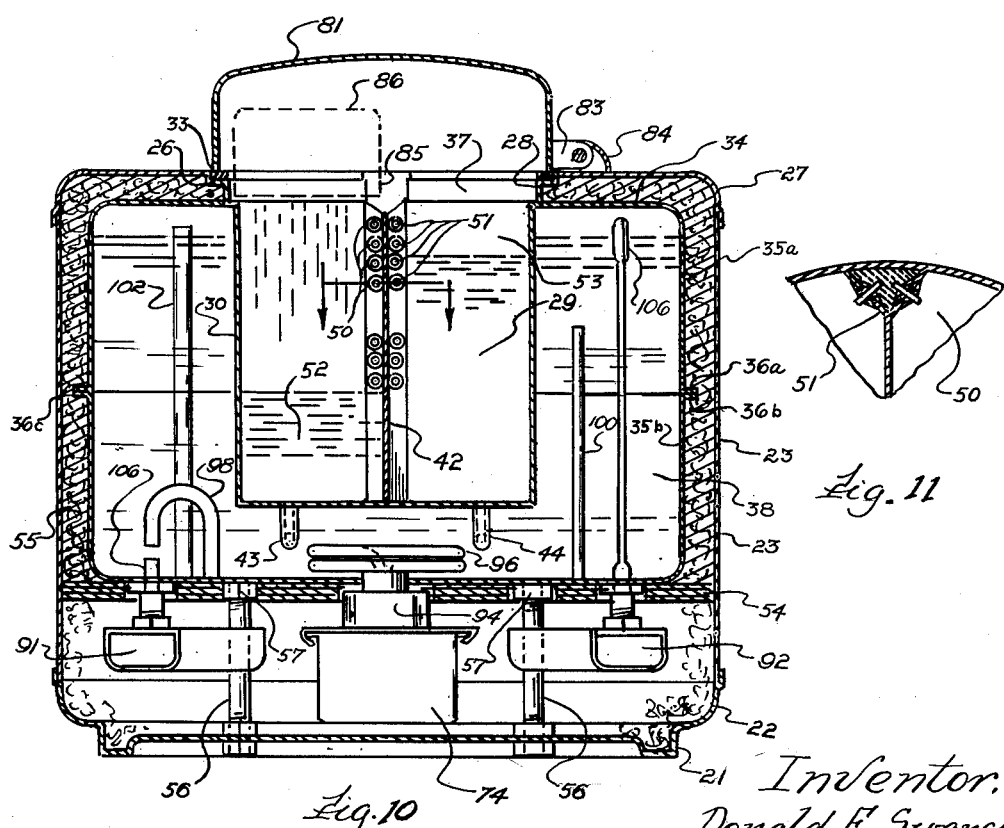

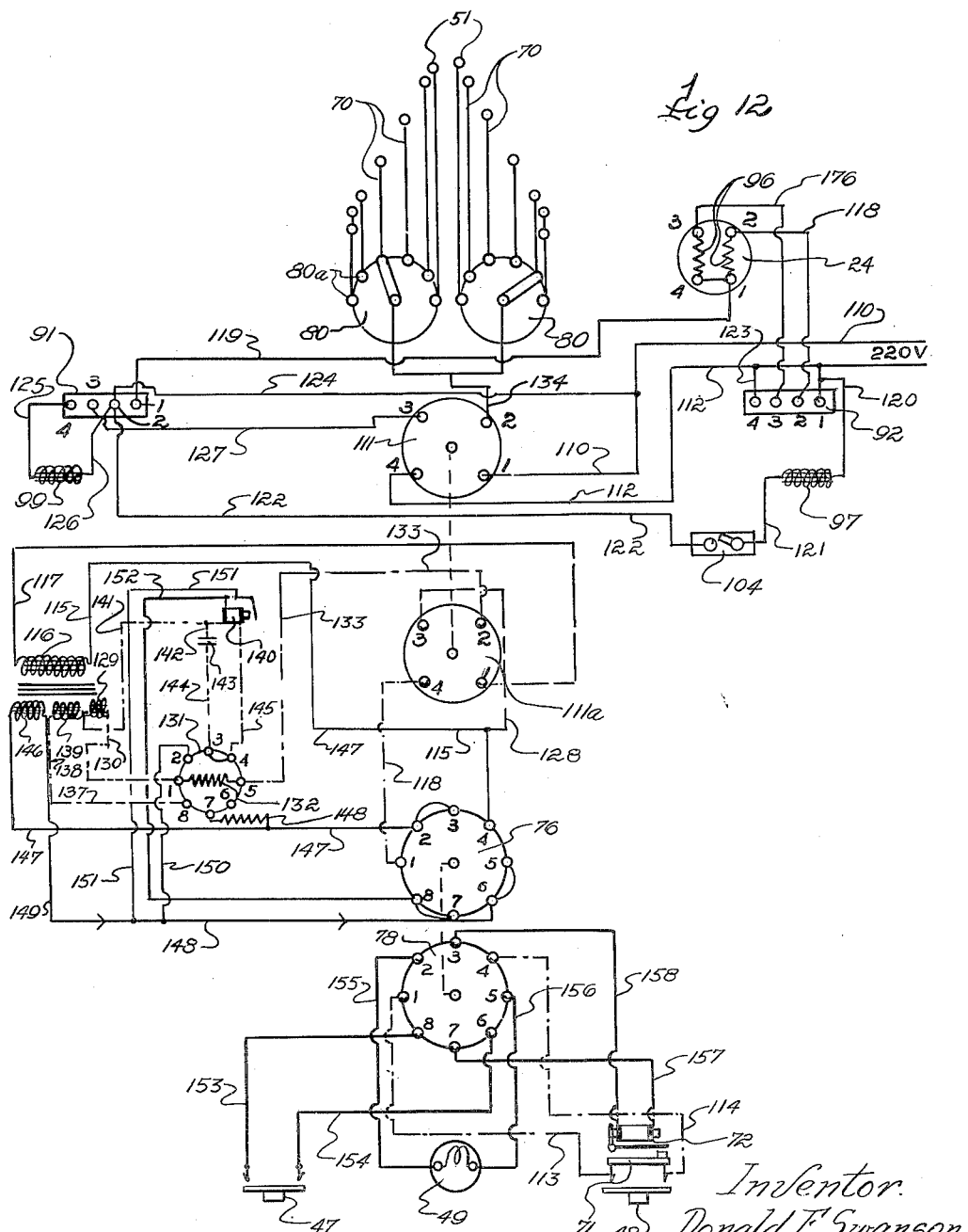

Patented Oct. 14, 1952

2,613,588

UNITED STATES PATENT OFFICE 2,613,588

AUTOMATIC COFFEE MAKING AND DISPENSING APPARATUS

Donald F. Swanson, Chicago, Ill.

Application August 19, 1948, Serial No. 45,176

3 Claims. (Cl. 99—283)

My invention is directed to novel improvements in automatic coffee brewing devices and apparatus. More particularly my invention is directed to a novel combination and arrangement of parts and mechanism and to a novel method of brewing and of control of conditions which are important in the satisfactory brewing of coffee.

One of the objects of my invention is the provision of an automatic coffee urn which includes a plurality of electrical actuating devices operatively connected to the means for causing a transfer of varying amounts of water as desired to the compartment or compartments in which the beverage is brewed according to the volume of beverage desired to be brewed at the particular time.

Another object and accomplishment of my invention is the provision of manually adjustable means for presetting electrically operated mechanism for controlling the volume of hot water to be forced into a brewing chamber according to the volume desired to be brewed.

Further objects and accomplishments of my invention are the provision of adjustable manually controlled coffee brewing devices which include constantly viewable means for indicating if the electrical circuit to the heating elements are on or off; beverage level control means; temperature-responsive means for automatically cutting off the electrical power to the heating elements; means for closing the path of flow of hot water when the hot water delivery means is moved from a position over one tank to another tank; and automatic means for keeping closed the delivery circuit of hot water from the reservoir to a position of delivery to a beverage brewing chamber or tank when the water is of a temperature too low for satisfactory brewing of coffee.

On the drawings:

Fig. 1 is a front elevation of my automatic coffee brewing device.

Fig. 2 is a top plan view thereof.

Fig. 3 is a top plan view thereof with the top dome or cover removed.

Fig. 4 is a front elevation of my device with part of the outer metal jacket or shell and adjacent insulation removed and shown in section.

Fig. 8 is a rear elevation of the indicator panel with attached parts and which is shown in front elevation in the lower part of Fig. 4.

Fig. 9 is a vertical section through the indicator plate and taken substantially on line 9—9 of Fig. 8.

Fig. 10 is a cross sectional view of my device taken substantially on a vertical transverse plane through the center of my device.

Fig. 11 is an enlarged detail sectional view of one of the water level control switches and on a plane indicated by line 11—11 of Fig. 10.

Fig. 12 is a diagrammatic view showing the wire circuits to the respective parts.

Figure 5:
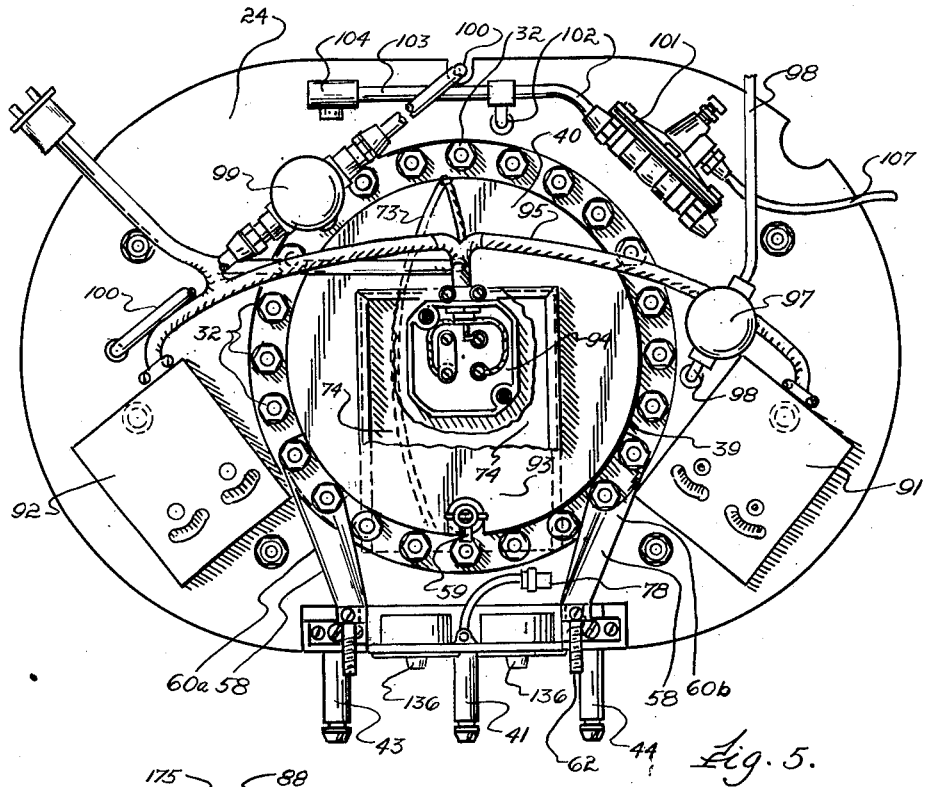
Fig. 5 is an enlarged view of the base and looking at the bottom of the device.

Referring to the drawings, reference numeral 21 designates a suitable metal base such as steel, which is preferably formed with an outwardly extending annular flange 22. A shell, housing, or casing generally designated by numeral 23, composed of an appropriate metal such as stainless steel, preferably of a shape or form which will unite with the base 21, forms the outer wall of the device. Said outer wall preferably engages the annular flange 22 of the metal base 21, and is united to said base by an appropriate means such as welding. The upper portion 27 of the outer wall 23 preferably extends horizontally and inwardly, and is preferably welded or equivalently united to the upper vertical limit of said outer wall 23.

The inner upper annular ring 33 of the outer wall 23, engages an upper annular flange 26, of an annular lip 25, of an annular ring 28 of the wall 30 of the brewing pot or tank 29 which is to be hereinafter further described. Said flange 26 is united to said ring 33 at the line, area, or region of engagement, by a suitable means such as welding.

From the annular ring 28 of the innermost wall 30, an inner wall which is preferably made of any suitable metal which is also of low heat conductivity, extends horizontally and outwardly and then bends downwardly to parallel the outer wall.

The upper inner extremity of the upper part 34 of the inner wall 24 forms an annular ring 75. Where said ring 75 engages the annular ring 28 of the innermost wall 30, the annular ring 30 and the annular ring 28 are joined by a suitable means such as welding.

The inner shell, wall, or liner 24 is preferably formed of two parts designated as numerals 35a and 35b. The upper portion 35a of the inner wall 24 extends outwardly in a slight annular flange 36a. Said flange 36a engages a similar flange 36b of the lower portion 35b of the inner wall 24, preferably at the middle or center of the vertical height of the inner wall 24. At the line, area, or region of engagement, flange 36a and flange 36b are united by an appropriate means such as welding, to form an annular lip or ridge 36c.

The lower portion 35b of the inner wall 24 extends vertically downward and at its lower portion bends inwardly and preferably horizontally to define a central opening and accessible passageway in which central passage, clean-out cover or plate 40 is adapted to be removably mounted, for example, by screws, to permit access to interior parts in assembly and during repair of the unit. A suitable gasket 39 is mounted between the peripheral flange of plate 40 and the lower inner peripheral ring of the lower portion 35b of the inner wall 24 to effectively seal said passage. Said plate is held in place by a suitable means such as a plurality of screws 32, which are preferably threaded through peripheral ring of the plate 40.

An innermost wall 30 made of a suitable metal such as stainless steel, and having an outwardly extending annular ring 28, and a peripheral flange 25 is suspended or mounted in the opening 37. Said flange 25 is sealed to the inner wall 24 in a manner previously described, and is sealed to the outer wall in a manner previously described. The mounting of tank 30 causes an annular reservoir 38 to be formed, which bounded and limited on the outside by the inner wall 24 and its base plate 40, is bounded and limited on the inside by the tank or container 30.

The inner tank 29 optionally is provided with a central and vertical cross wall 42 to divide said tank into separate compartments indicated by numerals 52 and 53, so as to permit the use of either one or the other of said compartments. The compartments of tank 29 have mounted in the lower ends thereof respectively the end portions of outlet pipes or conduits 43 and 44 through which finished coffee is drawn and which pipes 43 and 44 lead to and are communicatively connected to exterior accessible faucets or valve cocks 45 and 46, and which valve cocks are suitably mounted on the outer wall at the desired locations. The place at which said outlet pipes 43 and 44 through which the finished coffee is drawn, pass through the inner shell 24 and the outer shell 23, are effectively sealed in a conventional manner to avoid leakage, as for example with the aid of opposed locknuts and gaskets (not shown).

An optional though desirable water outlet faucet or valve cock 31 is preferably mounted on the front face of the outer wall 23 and is continuous with a pipe or conduit which extends inwardly through openings in walls 23 and 24, being sealed to said opening in the usual manner to form a watertight seal. This faucet or valved water cock permits the selective withdrawal of hot water from reservoir in which the end opening of conduit 41 emerges.

Preferably mounted on the wall 30 of the innermost container 29 in an appropriate manner, in a vertical arrangement at the desired heights, are disks 50 composed of some insulating material such as porcelain. Passing through the center of said disks or plates are electrical wire ends 51 insulated from the metal of wall 30 of container 29 by said porcelain disks or cylinders 50. Disks and wire arrangements are provided for each compartment 52 and 53.

Immediately below the inner wall or shell 24 and its removable plate 40 and adjacent thereto, is a horizontal layer or sheet or lamina 54 of insulating material such as asbestos, whose peripheral limit abuts against the outer wall 23. Said layer forms the bottom of an insulating chamber 35 around the inner wall 24, which wall is the outer limiting wall of reservoir 38. The outer wall 23 forms the outer wall of insulating chamber 55. The insulating chamber is filled with an appropriate insulating material or liner for retaining heat in the reservoir 38.

Supporting the reservoir shell 24 are preferably four legs or rods 56, the threaded ends of which are screwed into the wall 24 and secured and locked by any appropriate means such as lock nuts indicated on Fig. 10 as number 57. Opposed lock nuts may be used as one means of securing legs 56 to the base 21.

Obliquely extending from plate 40 through the insulating liner 54 is preferably a bracket 58 for supporting an instrument or control panel or board 61 on the front face of the wall 23. Said brace consists of preferably two obliquely forwardly extending apertured rods or legs 60a and 60b which are composed of any appropriate material. At their central or inner or rear ends, said rods 60a and 60b are respectively held in position by several screws or bolts 32 and are secured to inner annular ring of shell 24 and plate 40 as indicated in Fig. 5.

At their radial or outer ends said rods 60a and 60b abut against the wall 23 from within. A pin or stud 62 passes through the apertured ends of each of said legs 60a and 60b of said bracket 58, and through the front face of the wall 23 and through the instrument or control panel 61, supporting said panel. Said panel is immovably pressed and abutted against said wall 23 by means of a nut 63 screwed thereon, one of which is screwed on the end of each of said studs 62. A gasket 64 or like protective device is spaced between nut 63 and instrument board 61.

The instrument or control panel 61 is preferably made of an esthetic plastic substance. Set or mounted in said panel in any suitable esthetic manner are two electrical selector switches 80, a "stop" button 47, a "go" button 48, and a "pilot" light 49. Each one of said selector switches controls the level of coffee in each of the tanks 52 and 53.

Spaced slightly behind each valved coffee draw-off cock 42 and 43 and abutting against the front face of the wall 23 is a sight gauge assembly 65 securely mounted in any appropriate fashion around each of the outlet pipes 43 and 44. A passageway or conduit in one of said vertically disposed sight gauges continuously communicates with the passage in the said outlet 43 and a like passageway or conduit in the other of said sight gauges continuously communicates with the passageway in the outlet pipe 44. The height of each of said sight gauges 65, is substantially the same as its respective brewing tanks 52 and 53 so that the level of the coffee in each of said tanks may always be discernible.

Preferably mounted on the clean-out cover of plate 40 in a suitable manner is a draincock 59, the passageway of which is continuously communicative with the reservoir 38.

As illustrated in Fig. 8 two selector switch cases 66, each of which corresponds to one of said tanks 52 and 53 respectively, are appropriately mounted in said panel 61. Aiding in securing said cases 66 are centrally apertured U-shaped brackets 67, the legs of which abut against the back of said panel 61. Screws 105 are threaded through said bracket 67 and into the said cases 66 to retain said cases. Each selector switch 80 is appropriately mounted in one of said cases 66.

In the back of each of the selector switch cases 66 an electrical socket 69 is mounted and set into said case and is retained in any suitable manner. Said socket 69 is supplied with electrical wire end contacts which communicate with the selector switch 80. A plug (not shown) adapted to be received in socket 69 electrically connects said selector switch with properly insulated electrical wires 70, the ends of which wires are the terminal wire ends 51 heretofore described. Said plug when in socket 69, is additionally supported by the bracket 67, the central aperture of which bracket permits said plug to be plugged into said socket.

Mounted behind the instrument panel, between said panel and the outer shell 23 is a microswitch 71 and relay 72. Said switch 71 and said relay 72 are magnetically connected to each other in the usual manner, with said microswitch being activated by pushing the "go" button 48. Electrical wires 73 from the "go" button 48, relay 72, pilot light 49 and "stop" button 47 are bundled or wrapped together in a properly insulated coat, and preferably terminate in an eight point plug 75, said plug being adapted to fit into a female socket 76 which is mounted in the control box 74 and to be hereafter described. A suitable bracket 77 which is retained by appropriate screws 79, as illustrated in Fig. 8, retains the wire bundle 73 from undesirable movement.

As illustrated in Figs. 5 and 10, numerals 91 and 92 represent electrically controlled thermostats which are suitably mounted on the bottom of the wall 24 in any appropriate manner to preclude leakage from the reservoir 38. Communicatively connected with each of said thermostats and passing through the lower wall and into the reservoir 38 is a thermostat well 106. Slidably but rigidly mounted beneath the inner wall 24 is a control box 74 which is releasably retained by means of a bracket 93. The bracket 93 is immovably retained by means, such as screws threaded into the bottom of a heater terminal box 94. The heater terminal box 94 in turn is appropriately and securely retained on the plate 40. Bundles of insulated wires 95 communicatively connect the thermostats 91 and 92 and the heater terminal box 94. Heater elements 96 communicatively connected with said heater terminal box 94 are positioned in the reservoir 38.

As illustrated in Fig. 5, a cold water solenoid and its actuated valve 97 are interposed in any conventional manner in the cold water line 98 which brings cold water from the water supply source to the reservoir 38. Where the cold water line 98 passes through the bottom of the inner wall 24 into the reservoir 38, said passage is effectively sealed in an appropriate manner to avoid leakage of water.

A brewing solenoid and its actuated valve 99 are positioned below the bottom of the wall 24 as illustrated in Fig. 5. Said valve 99 is interposed in any suitable manner in a pipe line or conduit 100 which communicatively connects the reservoir 38 with the spray head 89. Where the pipe or conduit 100 passes through the bottom of the wall 24, the opening provided for such passage is effectively sealed from water leakage. As illustrated in Fig. 3, the pipe 100 passes between the outer wall 23 and the inner wall 24 up the back of the coffee urn, and turning inwardly it passages the ring 28.

As illustrated in Fig. 5, also securely positioned beneath the bottom of the wall 24 is a pressure relief valve 101. Said valve is interposed in conduit or pipe 102 which communicatively connects the reservoir 38 with a drain-off pipe 107 outside the urn. A pipe or conduit 103 communicatively connects the conduit 102 with a pressure switch 104 in a manner so that the pressure applied against said pressure switch will control the flow of water through valve 97 as hereinafter described. It is to be understood, however, that any equivalent mechanical pressure relief means may be employed.

For the brewing of coffee I employ a leecher bucket hood and sprayhead of the class described in my co-pending application, Serial No. 676,681 now issued as Patent No. 2,539,708. Said brewing apparatus receives its hot water supply from the reservoir 38, said water being delivered through the conduit 100.

Referring to Figs. 1, 2, 3, 4 and 10, numeral 81 designates a dome-like metal cover having a suitable handle 82, said cover being pivotally mounted to the top wall of the urn unit by means of a projecting metal arm or lever 83 which is pivoted to a suitable apertured bracket 84 substantially as illustrated. The periphery of said cover is adapted to seat, when the same is closed, on the annular lip 25, as shown in cross section in Fig. 10 at the upper edge of the coffee tanks 52 and 53.

As illustrated in Figs. 3 and 4, a preferably removable fabric 85 is adapted to be alternately and horizontally swung over each of the tanks 52 and 53 as coffee is desired or required in each of said tanks.

Said fabric 85 fits entirely within the dome 81 and is adapted to hold ground coffee. Said fabric 85, preferably in the form of a bag, is adapted to be removably suspended or mounted over the annular edge of an apertured cap or cover or hood 86 and to be held in such position, as long as is desired, by a releasable locking clamp 87 which is adapted to hold the edge portion of the bag immediately above the edge portion of hood 86. The hood 86 preferably has three spaced apart holes or apertures 88 through which atmospheric air may be appropriately drawn, in the event a back pressure from the tanks 52 and 53 develops. The provision of these three apertures will preclude a backflow of coffee from the tanks 52 and 53. A suitable handle 90 is appropriately positioned on the hood 86.

Figure 6:
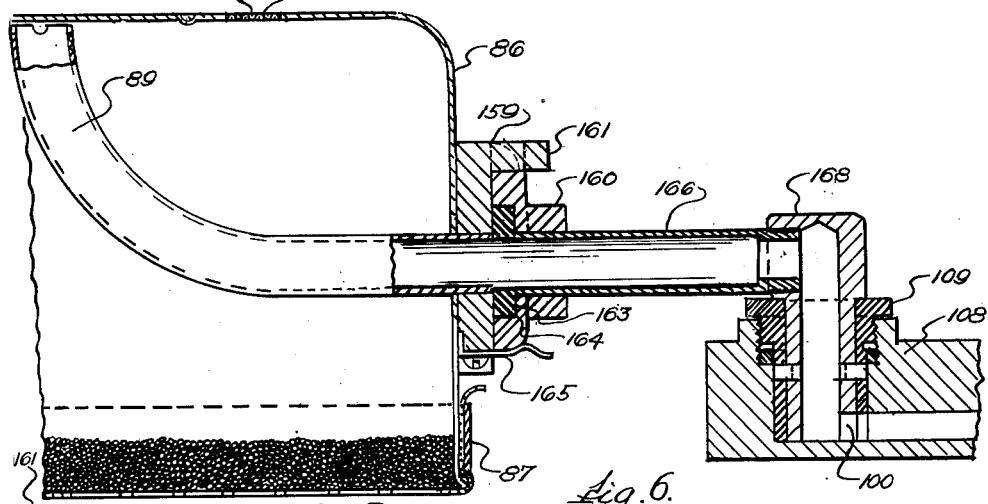
Fig. 6 is an enlarged detail cross sectional view of a portion of the hot water delivery means shown in section and showing the vents in the top of the extractor pot.
Figure 7:
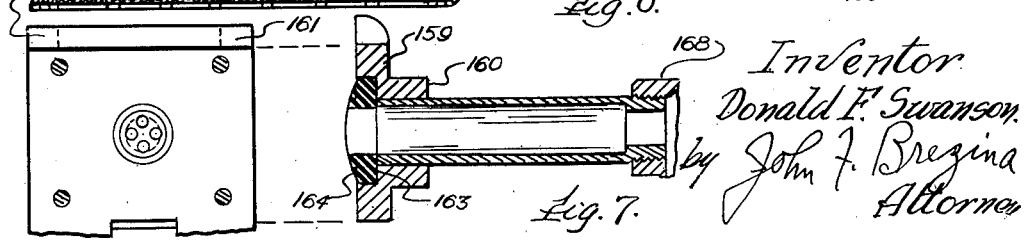
Fig. 7 is a detail sectional view of a part of the spray head delivery means and the removable mounting means for the cover or dome and showing the coupling plate in elevation.

As illustrated in Fig. 6, a passaged mounting block 159 is secured on hood 86 in any appropriate manner. The passage of the block 159 is threaded and adapted to have one threaded end of a curved delivery pipe or spray head 89 threaded in the passage of said block. The mounting block 159 on one transversely extending flange thereof has a pair of integral extending lugs or extensions 161, as shown in Fig. 7, which are releasably engaged by projecting teeth or lugs of a passaged fitting 160. Said fitting 160 has a central recess 163 in which is mounted a suitable yieldable sealing washer 164. Fitting 160 is securely mounted upon the end portion of a connecting pipe 166. The lower edge portion of the fitting 160 is adapted to be yieldably and releasably held in the position shown in Fig. 6 by a spring or clip 165 which is secured by a screw or the like to the lower portion of the mounting plate 159. Said pipe 166 may have interposed therein suitable manually controlled safety valve means (not shown). The end of the connecting pipe 166 is securely mounted in an aperture in the upper portion of a swivelly mounted fitting or post 168 whose lower reduced end is rotatably mounted and journaled in a bushing 109, said bushing 109 being threaded in bracket 108 as illustrated in Fig. 6.

The passage of said connecting pipe 166 and the passage in said swivelly mounted fitting 168 communicates with the passage of the hot water delivery pipe 109. It will be understood that the said fitting 168 permits the delivery pipe 89 (as well as the hood 86) to be selectively pivoted in a horizontal direction so as to selectively cause delivery of hot water to either of the brewing tanks hereinbefore described.

Referring again to Figs. 3 and 6 and specifically to the holes, apertures or vents 88, said vents are optionally though preferably equally spaced from each other. Each of said vents 88 preferably has a screen 175 mounted therein, for example by soldering the edge portion thereof. As was explained before, one function of these vents is to permit atmospheric air to be drawn through the hood 86. But also the vents 88 function in other capacities.

It is to be understood that the hood 86 and the bag or fabric 85 normally mounted thereon form an extractor pot or container. I have found that one of the major previously unsolved problems, in coffee brewing devices which have hot water delivered to the ground coffee container and those which are not of the percolator type, was to keep the coffee grounds in liquid suspension at all times during the extraction of the flavor therefrom, to thereby give a more uniform extraction of the coffee flavor and reduce the time required to extract the flavor.

I have also found that a heretofore insurmountable problem existed due to the entrapment of air between the top hood 86 and the top of the level of the incoming water in the extractor pot or unit, to thereby cause a caking of the coffee grounds in the bottom of the extractor pot and the plugging up of the pervious portion thereof. The described phenomenon would cause pressure to be developed in the extractor pot which was responsible for the rupturing of the pervious membrane.

By venting the hood 86 the herein described objections and unsolved problems become negative and solvable.

What occurs when the vents or holes 88 are used is a complete reversal of the phenomenon above described. When the hot water comes into the extractor pot bubbles of air will rise through the vents 88; the ground coffee in the fabric 85 will go into suspension in the hot water. Some of the grounds will tend to plug up the screen 175, not sufficiently, however, to cause complete entrapment of air in the extractor pot. The coffee grounds will no longer be caked against the fabric 85, to thereby prevent the hot extracting liquid from passing through said fabric, but will become suspended in the extracting liquid. As a consequence extraction time is greatly lessened, the packing of the coffee grounds against the fabric 85 no longer occurs to any objectionable extent and thereby permits the extracting liquid through the pervious fabric, and the objectionable pressures which often were sufficient to rupture the pervious material no longer exist. As a further consequence a more complete extraction of the coffee grounds occurs.

In Fig. 12 I have shown the electrical circuits diagrammatically.

DESCRIPTION OF 220 VOLT CIRCUITS

(A) Main power circuit

Referring to the upper right in Fig. 12, circuit wire 110 leads from a source of electric power, preferably 220 volt, and leads to a terminal designated as "1" on a four pointed plug 111 which is mounted beneath inner wall 24 of the device. Said plug 111 is composed of two sections and is separable, the other cooperating male section thereof being designated as 111a.

Numeral 112 designates a circuit wire which connects the other connection of a power source to terminal marked "4" on plug 111. The manner in which the device is electrically activated is by depressing the "Go" button 48, which produces an electrical connection between wires 113 and 114. Wire 113 connects one side of said "Go" switch with a terminal marked "1" of male plug 78. Wire 114 is electrically connected to the terminal marked "4" in the plug 78.

As shown in Fig. 12, the female plug 76 interfits with male plug 78 and has corresponding spaced terminals "1" to "8" inclusive. When male plug 78 is fitted into plug 76 and the "Go" switch is closed the terminals "1" and "4" of plug 76 will transmit the electricity through the wires 113 and 114.

From terminal "4" in socket 76 circuit wire 115 is connected to transformer 116 which is mounted inside the control box 74 (in Figs. 5 and 10).

Circuit wire 117 connects the opposite terminal of said transformer 116 to terminal marked "1" in plug 111a. From terminal "1" of socket 76 circuit wire 118 leads to terminal marked "4" of male plug 111a. This has described the circuit wire connection to terminals "1" and "4" of plug 111 (when male plug 111a has been positioned into cooperating plug 111). This has completed the circuit from the "Go" button 48 to the power source.

B.—*Description of circuit of heater means, cold water supply control means and pressure switch.*

Referring to Fig. 12, thermostat 92 is a heater control thermostat which is preferably normally closed. Terminals "1" and "2" of said thermostat 92 activate the heater element 96 between terminals "1" and "2" of said heater element. Terminals "3" and "4" of the thermostat 92 perform the same function for the heater element 96 between terminals "3" and "4" of said heater element. It is to be understood that the heater is preferably a dual type immersion heater.

Thermostat 91 functions both as a limit thermostat and as a circulation thermostat as will be presently described. Terminals "1" and "2" of thermostat 91 are normally closed or connected, said terminals serving as a safety or limiting means. The terminals "1" and "2" of thermostat 91 being closed, break the circuit to the heater elements 96 in the event that thermostat 92 does not operate or fails to perform to break the circuit when the water in the reservoir reaches the required temperature.

The circuit employed and illustrated in Fig. 12 is as follows:

Wire 118 electrically connects terminal "2" of thermostat 92 with terminal "2" of the heater element 96, said wire 118 being electrically connected through the heater element 96 between terminals "2" and "1" thereof to wire 119, which wire 119 terminates at terminal "1" of the heater 96, the other end thereof being connected to terminal "1" of the thermostat 91. Terminals "1" and "2" of both the thermostats 91 and 92 are normally electrically connected to each other, said terminals being normally closed.

A wire 120 preferably at one end thereof is connected electrically to terminal "1" of the thermostat 92. Said wire 120 at the other end thereof terminates at one of the terminals of the cold water inlet valve solenoid 97. The wire 120 is electrically connected through the solenoid 97 to wire 121 which in turn is connected to pressure switch 104. The wire 121 is electrically connected through the normally closed pressure switch 104 to wire 122 which is in turn connected to terminal "2" of the thermostat 91.

To energize the cold water supply circuit a wire 123 shunts electricity from power wire 112; said wire 123 is electrically connected to wire 120 and to terminal "4" and "1" of thermostat 92. A wire 124 electrically connects power wire 110 with terminal "2" of the thermostat 91 on the other side of the circuit.

Terminals "1" and "4" of heater 96 are electrically connected. A wire 176 connects terminal "3" of thermostat 92 with terminal "3" of said heater 96.

C.—Description of brewing circuit

To operate the brewing solenoid so that only water of the proper temperature will be permitted to be withdrawn from the reservoir 38 to be used in brewing coffee, a wire 125 connects terminal "4" of thermostat 91 with one terminal of the solenoid 99. The wire 125 is elecctrically connected through the solenoid to wire 126, said wire 126 being also connected to terminal "2" of thermostat 91 where the brewing circuit is energized on one side by connection with wire 122 at said terminal "2." Terminals "3" and "4" of thermostat 91 are normally disconnected, but when the temperature is sufficiently high the terminals "3" and "4" close establishing an electrical connection thereby. To complete the brewing circuit, a wire 127 connects terminal "3" of the thermostat 91 with terminal "3" of the plug 111. When said plug 111 is fitted onto plug 111a, terminals "3" of both plug 111 and 111a become connected. A wire 128 connects terminal "3" of plug 111a with wire 115, said wire 115 being connected to the power source as heretofore described.

Description of the ½ volt circuit

The transformer 116 has one coil thereof adapted to reduce the power to 40 volts as designated at 129 in Fig. 12. One circuit wire 130 connects one terminal of said transformer coil 129 to terminal "1" of electronic tube 131 shown diagrammatically in Fig. 12, and which is normally mounted in the control box 74. Said electronic tube 131 has eight spaced apart terminals numbered "1" to "8" inclusive. Wire 130 is connected with the resistor element 132 in tube 131 and said resistor is adapted to reduce the 40 volts to one-half volt. The wire 133 is connected to one terminal of the resistor 132 and to terminal "2" of male plug 111a.

Normally plug 111a is connected and interfitting with plug 111 so that the corresponding terminals are united. Likewise normally plug 78 is united to plug or socket 76 so that the corresponding terminals are united.

Terminal "2" of plug 111 has wire 134 having two branches connecting same to the central terminals of manually operated selector switches 80. Said selector switches each have a plurality of spaced terminal elements 80a which are respectively connected by a plurality of wires 70 to the end terminal elements 51 which have been previously described as being mounted in the brewing tanks.

The selector switches 80 each have a manually rotatable handle 136, as illustrated in Figs. 1 and 4, each of which handles are connected to a metal contact arm which is normally rotatable in the switch so as to contact any one of the terminal elements 80a of such switch. The face of each of said selector switches preferably has spaced markings as illustrated in Fig. 4, and these respective markings have relative positions according to the volume (and depth) of water in the brewing tank to which they are operatively connected.

Accordingly when a user desires a predetermined volume of water in the tank (which is known will have a level corresponding to the positioning of one of the vertically spaced end contact elements 51), he will move the handle 136 and its connecting arm to a given selected position which will thereby electrically connect the central terminal of said selector switch 80 to the selected terminal 80a, to thereby also electrically connect the wire 134 to such selected end terminal element 51.

When the water rises to reach such selected end terminal element 51 (which has been electrically energized by selection as aforesaid) it will become grounded through the water body and cause electrical connection to be established between the wire 137, as indicated at 138 (see left of Fig. 12). The wire 137 is electrically connected to the 110 volt terminal 139 of the transformer 116. The wire 137 is also connected to terminal "8" of electronic tube 131. This completes an illustrative ½ volt circuit.

Description of 40 volt circuit

The function of this circuit is to automatically energize the relay 140, whose actuation is adapted to energize the relay 72 behind the micro switch 71 to thereby reset said microswitch to inoperative position, to thereby cause an opening of the main 220 volt power circuit heretofore described. It is to be understood that opening of the aforesaid main 220 volt circuit does not affect the circuits to the heaters and solenoid and actuated valve 97 heretofore described. However, such opening of said 220 volt circuit at switch 71 does affect the circuit which controls solenoid 99 of the hot water supply valve.

One terminal of relay 140 is connected by a circuit wire 141 to one of the terminals of the 40 volt transformer portion 129. A wire 142 shunts electricity from the wire 141 to a condenser 143 (shown at left of Fig. 12) through which condenser said wire 142 is electrically connected to a wire 144. Condenser 143 is preferably positioned in the control box 74. Wire 144 is connected to terminals 3 and 4 of electronic tube 131. A wire 145 connects terminal "4" of tube 131 to the opposite end of the coil of the relay 140, as illustrated in Fig. 12.

When the wire end terminals 51 are not grounded to establish a circuit with the wire 137 the relay 140, being energized as above described, will hold its switch in open position. On grounding of the wire ends 51 to establish a circuit with the wire 137 as above described, the electrical field in the electronic tube 131 will be reversed with a consequent reversal of flow of electricity to the relay 140. As will be described, the reversal of energization of the relay 140 will cause a closing of the switch arm of relay 140, and the consequent re-setting of the micro-switch 71 to break the circuit to the main power line, thereby causing stoppage of the flow of hot water from the reservoir 38 to delivery position with respect to tanks 52 and 53.

*Description of 24 volt circuit*

This circuit has as its function the setting into operation of the automatic control means for selectively delivering hot water through the pipe delivery means to positions to drop into either of the tanks 52 and 53.

Upon depression of the "Go" button 48, as has been hereinbefore described, the 220 volt circuit which energizes the transformer 116 becomes activated. The transformer 116 has a 24 volt coil 146 and terminal connections therefor. A wire 147 connects one of the terminals of coil 146 to terminals "2" and "3" of socket 76.

Shunting electricity from the wire 147 is a resistance wire 148 which is connected to terminal "7" of the electronic tube 131. From the opposite terminal of the coil 146, a wire 149 carries electricity to terminals "5" and "6" of socket 76. Shunting electricity from wire 149 to electronic tube 131 is a wire 150. Terminals "2" and "7" are electrically connected within the electronic tube 131 as illustrated.

Carrying electricity from the wire 149 to a switch arm of relay 140 is a wire 151.

In normal operation, the switch arm is in circuit closing position by the energized 40 volt circuit previously described. A wire 152 is connected from the coil of relay 140 to terminals "7" and "8" of this socket 76.

From the stop button switch 47 a wire 153 connects same to terminal "8" of plug 78 (and 76). Another wire 154 connects the other terminal of said stop button switch to terminal "6" of plug 78 (and 76). The terminals "6" and "8" of the plug 78 will be electrically connected when the stop button is depressed.

From one of the terminals of the pilot light 49 a wire 155 electrically connects said terminal to terminal "2" of plug 78 (and 76). Another wire 156 connects the opposite terminal of said pilot light 49 to terminal "5" of plug 78.

A wire 157 connects one terminal of the coil of relay 72 to terminal "7" of plug 78. Another wire 158 connects the other terminal of the coil of said relay to terminal "3" of plug 78.

Pushing the "Stop" button 47 causes an electrical connection between the wires 153 and 154. Said connection causes the relay 72 to close, to thereby reset microswitch 71. The resetting of microswitch 71 causes the main power circuit to the transformer 116 to be broken, to thereby stop energy from flowing to all the dependent structures hereinbefore described.

*Brief description of operation of the device*

The thermostat 92 and terminals "1" and "2" of thermostat 91, the heater 96, the solenoid 97 and pressure switch 104 have circuits which are independent of the transformer 116. These operate directly off the main power lines 110 and 112. By connecting the device with a main power source the above recited structures operate as described.

The heater thermostat 92 and the limit thermostat (terminals "1" and "2" of thermostat 91) will cause the water in the reservoir 38 to be heated to the desired temperature and will cause the heating circuit to be broken when the water is above the desired temperaure. Dependent upon the pressure created in the reservoir 38 is the normally closed pressure switch 104. When the pressure within the reservoir 104 is below a preferred amount a circuit will be closed to thereby energize the solenoid and its actuated valve 97 to permit the flow of water into the reservoir. It should be understood however, that any manual adjustable equivalent means may be employed as a pressure regulator. The operation of the remainder of the structures is dependent upon the energization of the transformer 116. By operation of the "Go" button 48 the wires 113 and 114 are electrically connected so as to establish a circuit and thereby cause current from the main power source, via wires 110 and 112, to energize the transformer 116. When the transformer 116 is energized a circuit is completed which will permit the operation of the solenoid and its actuated valve 99. The solenoid and actuated valve 99 are the hot water solenoid and brewing valve.

The manner in which these operate is to permit hot water to normally flow from reservoir 38 into the selected brewing tank 52 or 53. Upon the breaking of the circuit to the transformer in any manner, the solenoid operating the valve 99 will become de-energized and cause said valve to close, to thereby stop the flow of water from the reservoir 38 to the tanks 52 and 53. The end terminals 51 receive their energy from the 40 volt coil 129 of the transformer 116. Consequently any means which causes an interruption in the current through said transformer will render these end terminals inoperative.

When electrical energy is flowing through transformer 116, and consequently through the selector switches 80, current from the transformer 116 will flow to one of the terminal ends 51 which is selected by the selector switch 80. The hot water solenoid and its actuated valve being normally open when energized, hot water will flow from reservoir 38 through the pipe 100, through the spray head and into the desired tank up to the level of the selected end terminal 51. When the liquid comes in contact with the energized end terminal 51, a circuit is established between the transformer coil, the electronic tube and the relay 140 to cause a closing of said relay and a consequent closing of the relay 72 to thereby reset the micro switch 71. Resetting of the micro switch 71 electrically disconnects the wires 113 and 114, causing the circuit to the transformer 116 to be broken, with a consequent deenergization of the transformer 116. Said deenergization of transformer 116 causes brewing valve solenoid 99 to become de-energized and the dependent valve will close.

Another method or manner in which the hot water solenoid and its actuated valve 99 may be closed, to stop the flow of water from the reservoir 38 through the pipe 100, to the tank 29, is by connecting the wires 153 and 154. This may be done by pushing the "Stop" button to, thereby cause relay 72 to be energized. The energization of the relay 72 will cause a resetting of the micro switch and a consequent de-energization of the transformer 116.

As it is now understood, by pushing the "Go" button 48 each of the selector switches 80 becomes energized. A selector switch 80 is provided for each of the tanks represented here by the numerals 52 and 53. (It is to be understood that there may be more or less than two tanks.) Each of the selector switches is provided with a manually operated dialhandle 136 so that the contact in the switch 80 may be turned to engage any of the terminals 83 to thereby activate the contacted terminal. This will cause the terminal end 80a selected to be energized because of the continuous connected electrical path established as described. Because the solenoid activated valve 99 is normally open when its circuit is connected to a power supply source hot water from the reservoir 38 will normally tend to flow from the reservoir 38 to the selected tank. Upon the rise of the liquid to the point of the end terminal 51 which is electrically connected to the terminal 80a, which has been selected, a circuit will be established as described to cause a resetting of the micro switch and a consequent stopping of the rise of the level of the liquid in the selected tank (52 or 53).

The present invention has been described herein more or less as to details, yet it is to be understood that the invention is not limited thereby, as changes may be made in the arrangement and proportion of parts, and equivalents may be substituted without departing from the spirit and scope of the invention.

I claim:

1. In an automatic beverage brewing device, a hot water reservoir; a plurality of brewing tanks; a housing enclosing said tanks and said reservoir; a plurality of vertically spaced end terminals in said brewing tanks; a plurality of selector switches electrically connected to said end terminals respectively; a hot water delivery pipe connecting said reservoir and adapted to discharge into said brewing tanks; a water supply pipe connecting said reservoir and a water supply source; a solenoid operated valve in said water supply pipe; a solenoid operated valve in said hot water delivery pipe; a manually operated starting switch mounted on said beverage brewing device; a manually operated stopping switch mounted on said beverage brewing device; a transformer electrically connectable to said switches and being energized by a power supply source when said starting switch is closed and being deenergized when said stop switch is closed, said transformer being connected to said hot water pipe solenoid; said transformer having a plurality of coils of varying voltage; thermostats mounted in said reservoir; circuit wires connecting said hot water pipe solenoid and said thermostats and permitting selective delivery of water to said brewing tanks only when the temperature of the water is above a predetermined degree; circuit wires connecting said transformer and said solenoid of said hot water delivery pipe for controlling the delivery of water from said reservoir to said brewing tanks only when the water is above a predetermined degree; an electronic tube electrically connected to one of said voltage transformer coils when energized, circuit wires connecting said electronic tube to said selector switches, circuit wires connecting a second of said transformer coils to said terminals and said electronic tube; a relay electrically connected to said electronic tube; the contact of rising liquid entering the brewing tank with said terminal ends causing completion of a circuit in said second mentioned transformer coil; the electrical field in said electronic tube closing said relay, and circuit means connected to said relay when energized and adapted to open said starting switch and circuit wires connecting a third transformer coil and said stop switch, said stop switch when closed establishing a circuit in said third transformer coil and said relay to thereby close said relay and open the start switch.

2. In an automatic beverage brewing device, a hot water reservoir; a plurality of brewing tanks; a housing enclosing said tanks and said reservoir; a plurality of vertically spaced end terminals in said brewing tanks; selector switches connected to said end terminals for selectively electrically connecting certain of said terminals with said switches; a hot water delivery pipe connected to said reservoir and adapted to selectively discharge into said brewing tanks; a solenoid operated valve in said hot water delivery pipe; a starting switch mounted on said beverage brewing device; a stopping switch mounted on said beverage brewing device; a transformer electrically connectable to said switches and being energizable by a power source upon operation of said starting switch; said transformer being connected to said hot water delivery pipe solenoid and permitting opening thereof only when said transformer is energized; thermostats mounted in said reservoir; circuit wires connecting said hot water pipe solenoid and said thermostats and permitting selective delivery of water to said brewing tanks when water in said reservoir is above a certain temperature; an electrical mechanism connected to certain of the coils of said transformer, the contact of rising liquid with the selected terminal end in said brewing tanks completing a circuit with said electrical mechanism; a relay electrically connected to said electrical mechanism, circuit mechanism between said relay and said starting switch, the closing of said relay causing opening of said starting switch thereby cutting off the power to said transformer; said stop switch when closed completing a circuit within one of said transformer coils; said last mentioned coil being connected to said relay and when energized causing opening of said starting switch, the closing of said starting switch actuating said electrical mechanism to open said relay.

3. In an automatic coffee brewing device, a water reservoir, means connected to a supply of water for delivering to and automatically maintaining a predetermined volume of water in said reservoir, means for heating the water within said reservoir, at least one brewing tank, pipe means connected to said reservoir and adapted to conduct hot water from the reservoir into said brewing tank, a normally closed electrically operated solenoid valve in said pipe means, said valve being connected in electrical circuit with said thermostat and being adapted to be opened only when the water in the reservoir has attained a predetermined temperature, normally open manual switch means in electrical circuit with said valve, said manual switch means when closed being adapted to energize said valve to open the same to permit hot water to flow from the reservoir to the brewing tank, a plurality of vertically spaced bare electrode means disposed within said brewing tank, a multi-contact manually operable selector switch having a plurality of contacts each in electrical connection with one electrode means, said selector switch being in electrical circuit with relay means operatively connected to said manual switch means, said electrode means being adapted to be exposed to the liquid within said brewing tank so that when the liquid contacts an electrode means preselected by said selector switch the said liquid completes a circuit through said relay to energize the same and to open said manual switch thereby to close said second valve and arrest the flow of water to said brewing tank.

DONALD F. SWANSON.

REFERENCES CITED

The following references are of record in the file of this patent:

UNITED STATES PATENTS

| Number | Name | Date |
|---|---|---|
| 19,790 | Ingraham | Mar. 30, 1858 |
| 1,346,898 | Kingsbury | July 20, 1920 |
| 1,481,885 | Beach | Jan. 29, 1924 |
| 1,607,899 | Long | Nov. 23, 1926 |
| 1,762,208 | Aborn | June 10, 1930 |
| 1,809,899 | Heroy | June 16, 1931 |
| 1,822,433 | Brand | Sept. 8, 1931 |
| 1,831,898 | Wignall | Nov. 17, 1931 |
| 1,837,368 | Medin | Dec. 22, 1931 |
| 1,869,720 | Strand et al. | Aug. 2, 1932 |
| 2,012,645 | Thomas | Aug. 27, 1935 |
| 2,013,694 | Melzer et al. | Sept. 10, 1935 |
| 2,202,197 | Ewertz | May 28, 1940 |
| 2,206,424 | Oyen | July 2, 1940 |
| 2,319,075 | McKinnis | May 11, 1943 |
| 2,340,070 | McCauley et al. | Jan. 25, 1944 |
| 2,360,194 | Bright | Oct. 10, 1944 |
| 2,372,448 | Porteous | Mar. 27, 1945 |
| 2,457,903 | Kantor et al. | Jan. 4, 1949 |
| 2,485,246 | Swanson | Oct. 18, 1949 |
| 2,493,932 | Swanson | Jan. 10, 1950 |
| 2,544,836 | Hotvedt | Mar. 13, 1951 |

FOREIGN PATENTS

| Number | Country | Date |
|---|---|---|
| 189,585 | Switzerland | May 18, 1937 |